United States Patent [19]

Tom et al.

[11] Patent Number: 4,865,822
[45] Date of Patent: Sep. 12, 1989

[54] PROCESS FOR PURIFYING HYDROGEN SELENIDE AND HYDROGEN TELLURIDE, TO REMOVE MOISTURE AND OXIDANT IMPURITIES THEREFROM

[75] Inventors: Glenn M. Tom, New Milford; Duncan W. Brown, Wilton, both of Conn.

[73] Assignee: Advanced Technology Materials, Inc., New Milford, Conn.

[21] Appl. No.: 255,765

[22] Filed: Oct. 11, 1988

Related U.S. Application Data

[62] Division of Ser. No. 80,478, Jul. 31, 1987, Pat. No. 4,797,227.

[51] Int. Cl.$^4$ ............... B01P 47/00; B01J 8/00
[52] U.S. Cl. ..................... 423/210; 423/509
[58] Field of Search ..................... 423/210, 509

[56] References Cited

U.S. PATENT DOCUMENTS

| | | | |
|---|---|---|---|
| 4,115,440 | 9/1978 | Sheng et al. | 562/533 |
| 4,124,633 | 11/1978 | Leonard | 562/598 |
| 4,603,148 | 7/1986 | Tom | 521/28 X |
| 4,659,552 | 4/1987 | Tom | 423/210 |

Primary Examiner—Gregory A. Heller
Attorney, Agent, or Firm—Steven J. Hultquist

[57] ABSTRACT

A scavenger, having utility for purifying a mixture comprising:
(i) a primary component selected from one or more members of the group consisting of hydrogen selenide and hydrogen telluride, and
(ii) impurities selected from one or more members of the group consisting of moisture and oxidants, comprising:
  (a) a support; and
  (b) associated with said support, one or more members of the group consisting of:
    (I) precusor compounds of the formula $R_{3-x}AlH_x$, wherein x is 0 or 1, and R is a hydrocarbon radical containing from 1 to 12 carbon atoms; and
    (II) aluminum chalconides of the formula $Al_2M_3$, wherein M is selenium or tellurium.

Illustrative supports useful in such scavenger include aluminosilicates, alumina, silica, carbon, and macroreticulate polymers. A process and apparatus are disclosed for purifying hyhrogen selenide and/or hydrogen telluride, to remove moisture and/or oxidant impurities therefrom, in which a bed of the scavenger is employed.

9 Claims, 1 Drawing Sheet

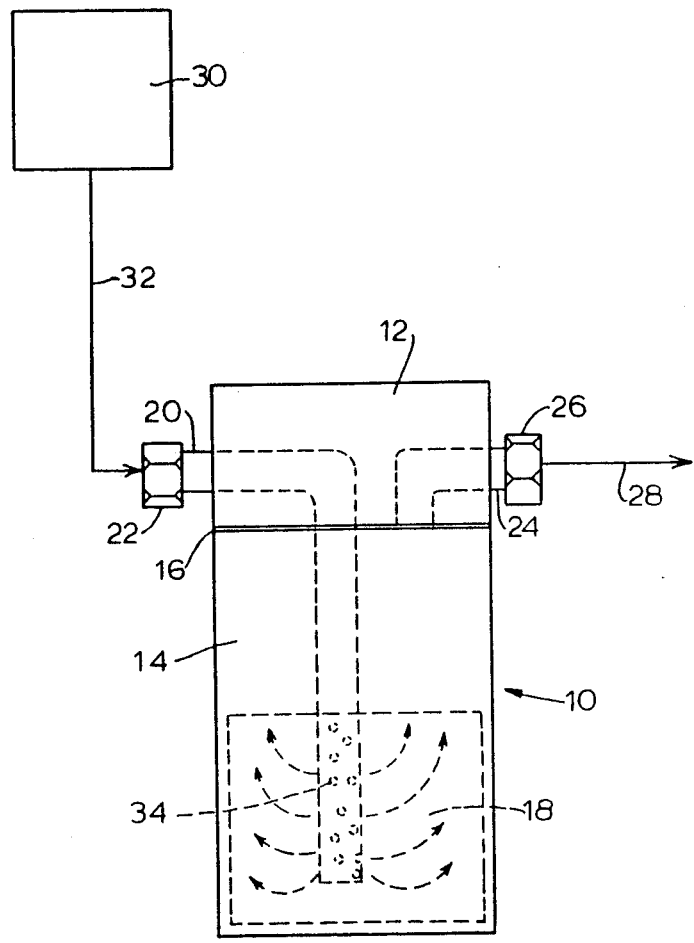

PROCESS FOR PURIFYING HYDROGEN SELENIDE AND HYDROGEN TELLURIDE, TO REMOVE MOISTURE AND OXIDANT IMPURITIES THEREFROM

This is a division of U.S. application Ser. No. 80,478 filed July 31, 1987 now U.S. Pat. No. 4,797,227.

BACKGROUND OF THE INVENTION

1. Field Of The Invention

This invention relates generally to a process, apparatus, and composition for removing moisture and oxidant impurities from hydrogen selenide and/or hydrogen telluride.

2. Description Of The Art

Hydrogen selenide and hydrogen telluride are widely used in the semiconductor industry for the manufacture of microcircuitry devices, as source reagents for elemental selenium and tellurium, respectively. Specifically, these source reagents are used as n-type dopants for the manufacture of n-type semiconductors and infrared diodes.

In these applications, hydrogen selenide and hydrogen telluride are utilized in gaseous form and frequently contain undesirable contaminants, such as moisture and oxidants, e.g., water and oxygen. If such contaminants are present, they will be incorporated in the structure of the microcircuitry device. Such impurities, when introduced onto the semiconductor chip during its manufacture, tend to produce localized defects in the crystalline structure, which may themselves be electrically active, which may then propagate to produce an undesirable epitaxy, and render the chip deficient or even useless for its intended purpose.

Hydrogen selenide and hydrogen telluride are extremely difficult to purify because of their high reactivity and toxicity. Due to their high reactivity, these materials react detrimentally with many otherwise potentially useful scavengers, to poison the active sorption sites of such materials.

Insofar as we are aware, the prior art has not provided any suitable means or method for highly effecient purifying hydrogen selenide and hydrogen telluride, to remove moisture and oxidant impurities therefrom, and yield a purified effluent containing less than 1 part per million by volume of contaminant in the treated product.

Japanese Kokai Tokkyo Koho JP 60/222127 discloses the thermal decomposition of trimethyl aluminum to deposit elemental aluminium on a glass substrate, e.g., glass beads, following which the aluminum coating is reacted with arsine to form a scavenger for water and oxygen. Such method is not useful in application to the drying of hydrogen selenide or hydrogen telluride, however, since free arsine would be formed as a reaction product of such scavenger with the hydrogen selenide or hydrogen telluride, and such reaction product would contaminate the treated gas stream.

U.S. Pat. No. 4,603,148 to G. M. Tom discloses a macroreticulate polymer scavenger for removing moisture and oxidant impurities from inert fluids such as aliphatic hydrocarbons, olefins, and gases including nitrogen, argon, helium, xenon, hydrogen, carbon tetrafluoride, ammonia, and silane. The macroreticulate polymer backbone of the scavenger has bonded thereto a plurality of functional groups of the formula:

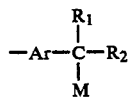

where: Ar is an aromatic hydrocarbon radical of 1 to 3 rings; $R_1$ and $R_2$ are each independently hydrogen, $C_1$–$C_{12}$ alkyl, methylene-bridged benzophenone, methylene-bridged fluorenone, or alkali or alkaline earth metal salts of such benzophenone or fluorenone radicals; and M is lithium, potassium, sodium, alkyl magnesium, or alkyl zinc, the alkyl substituents being $C_1$–$C_{12}$ alkyl. Within the pores of the macroreticulate polymer is a metallating agent selected from the group consisting of alkyl lithium, alkyl sodium, alkyl potassium, dialkyl magnesium, alkyl magnesium halilde, and dialkyl zinc, wherein the alkyl moiety is $C_1$–$C_{12}$ alkyl; alkali or alkaline earth metal salts of benzophenone; and alkali or alkaline earth metal salts of fluorenone.

The macroreticulate polymers which may be employed in this scavenger include those disclosed at column 3, line 60-column 4, line 6 of the Tom patent, with macroreticulate poly(styrene-divinylbenzene) being described as a preferred macroreticulate polymer for such purpose.

Among the Lewis acid and oxidant impurities for which the macroreticulate polymeric scavenger of this patent is disclosed to be effective, are oxygen, water, alcohols, phenols, aldehydes, ketones, carboxylic acids, carbon dioxide, carbon monoxide, alpha-acetylenes, allene, conjugated dienes, peroxides, sulfur compounds, and the like (column 5, lines 12–17).

The scavenger materials disclosed in U.S. Pat. No. 4,603,148, while generally effective in removing water from the fluids described hereinabove, are not suitable for the purification of gaseous hydrogen telluride or hydrogen selenide, because the active sites of such scavengers would be quenched instantly by the hydrogen telluride or hydrogen selenide.

This is unfortunate, since as the macroreticulate polymer disclosed in this patent represents a highly efficient configuration for contacting fluids to remove impurities therefrom. The macroreticulate polymer can readily be provided in the form of beads of high surface area, e.g., greater than 500 meters$^2$/gm, with a plurality of highly efficient sorptive sites for removing impurity constituents from numerous fluids.

Accordingly, it is an object of the present invention to provide a highly efficient composition, apparatus, and process for removal of moisture and oxidant impurities from gaseous hydrogen telluride and/or hydrogen selenide.

It is a further object of the invention to provide a scavenger of the type generally described above, having a high capacity for impurities, and which does not introduce any significant amount of impurities into the treated hydrogen selenide and/or hydrogen telluride product gas.

Other objects and advantages of the invention will be more fully apparent from the ensuing disclosure and appended claims.

SUMMARY OF THE INVENTION

In one aspect, the invention relates to a process for purifying a gaseous mixture comprising (i) a primary component selected from one or more members of the group consisting of hydrogen selenide and hydrogen telluride, and (ii) impurities selected from one or more members of the group consisting of moistures and oxidants, to remove such impurities therefrom, comprising:

contacting the mixture with a scavenger including a support having associated therewith an active scavenging component selected from one or more members of the group consisting of:

(a) $R_{3-x}AlH_x$, wherein x is 0 or 1, and R is an alkyl hydrocarbon radical containing from 1 to 12 carbon atoms; and (b) an aluminum chalconide of the corresponding primary component of the gaseous mixture.

In another aspect, the invention relates to a scavenger, having utility for purifying a gaseous mixture comprising (i) a primary component selected from one or more members of the group consisting of hydrogen selenide and hydrogen telluride, and (ii) impurities selected from one ore more members of the group consisting of moisture and oxidants, to remove said impurities therefrom, comprising:

(a) a support; and (b) associated with said support an active scavenging component, selected from one or more members of the group consisting of:

(I) $R_{3-x}AlH_x$, wherein x is 0 or 1, and R is an alkyl hydrocarbon radical containing from 1 to 12 carbon atoms;

(II) an aluminum chalconide of the corresponding primary component of the gaseous mixture.

Still another aspect of the invention relates to an apparatus for purifying a mixture comprising (i) a primary component selected from one or more of the group consisting of hydrogen selenide and hydrogen telluride, (ii) impurities selected from one or more of the group consisting of moisture and oxidants, comprising:

(a) a vessel containing a bed of the abovedescribed scavenger;

(b) means for introducing the mixture to the vessel for passage through the bed therein: and (c) means for discharging impurity-depleted mixture from the vessel.

Other aspects and features of the invention will be more fully apparent from the ensuring disclosure and appended claims.

BRIEF DESCRIPTION OF THE DRAWING

The single drawing is a schematic representation of a vessel containing a bed of a scavenger according to one embodiment of the invention, and an associated source of water-impurity-containing gaseous hydrogen selenide and/or hydrogen telluride, which is purified by passage through such vessel.

DETAILED DESCRIPTION OF THE INVENTION, AND PREFERRED EMBODIMENTS THEREOF

The scavengers according to the present invention comprise (a) a support, as more fully described hereinafter and (b) associated with such support, one or more compounds selected from the group consisting of compounds of the formula:

(i) $R_{3-x}AlH_x$, wherein x is 0 or 1, and R is an alkyl hydrocarbon radical containing from 1 to 12 carbon atoms;

(ii) aluminum chalconides of the formula $Al_2M_3$, wherein M is a metal selected from the group consisting of selenium and tellurium; and (iii) mixtures of compounds (i) and (ii).

Among the compounds of classes (i) and (ii) above, the aluminum chalconides of class (ii) are the active impurityscavening compounds, while the compounds (i), of the formula $R_{3-x}AlH_x$, are precursor compounds for such aluminum chalconides.

Thus, the support may be provided with associated compounds of formula (i), to form a scavenger which is activatable in situ in the hydrogen selenide or hydrogen telluride undergoing treatment, whereby such precursor compounds (i) are converted to the aluminum chalconides of formula (ii).

The precursor compounds (i) may for example include compounds such as trimethylaluminum, triethylaluminum, diethylaluminum hydride, ethylaluminum dihydride, aluminum trihydride, and the like. In the formula $R_{3-x}AlH_x$, the alkyl substituent R is an alkyl hydrocarbon radical containing from 1 to 12 carbon atoms, preferably from 1 to 8 atoms, and most preferably from 1 to 4 carbon atoms.

In the presence of gaseous hydrogen selenide and/or hydrogen telluride, the alkyl- and/or hydrogen-substituted aluminum compounds will be converted to the corresponding aluminum chalconides of formula (ii), as the active scavenging compounds, in accordance with the following reactions:

I. $2R_{3-x}AlH_x + 3H_2Se \rightarrow Al_2Se_3 + (6-2x)RH + 2xH_2$
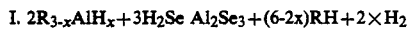

II. $2R_{3-x}AlH_x + 3H_2Te \rightarrow Al_2Te_3 + (6-2x)RH + 2xH_2$
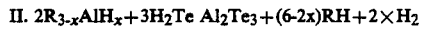

where x is 0 or 1 and R is aforementioned alkyl hydrocarbon radical.

It will be understood that in some instances, it may be desirable to employ as precursor compounds for the aluminum chalconides of the active scavengers of the invention, alkyl-substituted or alkyl- and hydrogen-substituted aluminum compounds whose alkyl substituents themselves are further substituted, provided that the further substituents of the alkyl radicals do preclude the efficacy of the associated aluminum compounds for forming aluminum chalconides as the active scavenging compounds in the scavengers of the invention. Accordingly, the term "alkyl" is broadly to be construed to include all such further substituted alkyl hydrocarbon radicals.

Concerning the precursor compounds of the formula $R_{3-x}AlH_x$, as between hydrogen and alkyl as substituents for the aluminum, alkyl substituents are generally preferred, for the reason that generation of hydrogen gas in the formation of the active scavening species is thereby avoided, as may be advantageous in various applications. Thus, when the precursor compounds are fully alkyl-substituted, viz., of the formula $R_3Al$, it will be apparent that free hydrogen gas will not be generated in the above reactions (I) and (II).

The scavengers according to the invention may comprise only precursor compounds of formula (i) above, or only active aluminum chalconides of formula (ii), or alternatively, the scavenger may comprise both precursor and active scavenging compounds (i) and (ii).

In any event, the precursor compounds and/or active scavenging compounds are associated with a suitable support which is compatible with such compounds as well as the impurity-containing hydrogen selenide and/or hydrogen telluride. The precursor and active scavening compounds are not covalently bonded to the support, as are the metallated functional groups of the previously described Tom U.S. Pat. No. 4,603,148. The type of non-covalently bonded association of the precursor and/or active scavenging compounds with the support is not critical; the precursor and/or active scavenging compounds may for example by dispersed throughout the support matrix in the form of particulates or agglomerates, or applied as film or plating on the support, or otherwise localized in pores of the support.

The active scavenging compounds and/or their precursor compounds thus may be applied to the support material in any suitable manner whereby the compounds are not covalently bonded to the support. These compounds may for example, be physcially absorbed on the support surface, or co-precipitated with the support material from a common solvent for both the support and such compounds, or in any other suitable manner.

Although the scavengers according to the present invention are illustratively described hereinafter primarily in terms of their use in drying of gaseous hydrogen selenide and/or hydrogen telluride streams containing water impurity, it will be appreciated that compounds within the broad scope of the invention have utility for removing other impurity species from these primary component gases. Such other impurity species may include moisture and/or oxidant impurities, such as oxygen, carbon oxides, alcohols, aldehydes, ketones, as well as any other impurity species which are removable by reaction with the active scavening compounds of the invention.

As used herein, the term "primary component" refers to the hydrogen selenide and/or hydrogen telluride which is present in the gas mixture. It is to be understood that either hydrogen selenide or hydrogen telluride may be present alone, or such components may be purified together, when such gases are desirably combined for the end use application for which they are intended. In such instance, when hydrogen selenide and hydrogen telluride are present together as the primary component of the gaseous mixture being treated, it will be understood that in the active scavenger the corresponding aluminum chalconide compounds will be present for each of such gases. In general, the selenide aluminum chalconide is the preferred active scavenger compound when hydrogen selenide is be purified, and in like manner, the telluride aluminum chalconide is the preferred active scavenging compound when hydrogen telluride is the gas to be purified.

Using water as an illustrative impurity, the aluminum chalconides are reactive therewith in accordance with the following reactions:

III. 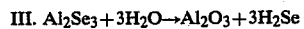 Al$_2$Se$_3$+3H$_2$O→Al$_2$O$_3$+3H$_2$Se

IV.  Al$_2$Te$_3$+3H$_2$O→Al$_2$O$_3$+3H$_2$Te

Corresponding reactions will take place with other proton source-containing impurities. It will be appreciated from the foregoing reactions (II) and (IV) that the only gaseous reaction product in each instance is the product gas component itself. Thus, aluminum selenide reacts with water to form alumina and hydrogen selenide as reaction products; correspondingly, aluminum telluride reacts with water to form alumina and hydrogen telluride.

Inasmuch as alumina (Al$_2$O$_3$) has an essentially negligible vapor pressure, and the co-reaction product is the desired product gas itself, i.e., hydrogen selenide and/or telluride, it will be seen that the scavengers according to the present invention can effectively remove water and other proton source impurities in a manner which entails substantially no contamination of the treated product gas stream.

Scavengers according to the invention, comprising only precursor compounds of formula (i) associated with the support, are referred as "unconditioned" scavengers, while such scavengers when pre-reacted with hydrogen selenide and/or hydrogen telluride, as appropriate, to form the active scavenging compounds on the support, are referred to as "preconditioned" scavengers.

As seen from formulae (i) and (ii) hereinabove, the conditioning of an unconditioned scavenger results in the generation of alkanes corresponding to any alkyl substituents removed from the aluminum prescursor compound in the conditioning step, together with gaseous hydrogen derived from any hydrogen substituents of the precursor aluminum compound. Accordingly, it will apparent that in some instances, where high purity gas is desired, the conditioning step will result in the formation of hydrocarbons and/or hydrogen reaction prodcuts, which may adversely contaminate the hydrogen selenide and/or hydrogen telluride gas stream. Accordingly, the conditioning step may be carried out prior to placement of the scavenger into active impurity-removing operation. Alternatively, the scavenger may be conditioned in situ in the process system, with diversion of the hydrocarbon- and/or hydrogen-containing product gas to waste disposal, or to treatment steps for removal of such hydrogen and/or hydrocarbon constituents.

Consistent with the foregoing discussion, the supports which are useful in the scavengers of the present invention, include any suitable materials which are compatible with the impurity-containing hydrogen telluride and/or hydrogen selenide being purified, the reaction products of the impurity removal, and any intermediates involved with conditioning or otherwise preparing the scavenger, and which are stable under the conditions of use.

Illustrative materials which may be potentially useful in the broad practice of the invention include materials such as macroreticulate polymers, carbon, aluminosilicates, alumina, and silica. As used herein, the term "aluminosilicates" means support compositions which include atoms of aluminum, silicon, and oxygen in their structure, such as molecular sieves; such aluminosilicates may be natural, e.g., kieselguhr, or synthetic in character.

Inasmuch as alumina (Al$_2$O$_3$) is a reaction product of the scavenging reactions shown in reactions (III) and (IV) above, alumina may in such instance be a preferred support material.

Among macroreticulate polymers which may be useful as supports in the broad practice of the invention are those formed from monomers such as styrene, vinyl toluene, vinylisopropylbenzene, vinyl naphthalene, alpha-methylstyrene, beta-methylstyrene, and mixtures thereof. Such polymers may suitably be polymerized in the presence of a cross-linking agent such as divinylbenzene or divinylnapthalene.

A particularly preferred macroreticulate polymer support is poly(styrene-divinylbenzene), commercially available as Amberlite XAD4 (50 Angstrom pore size) and Amberlite XAD2 (100 Angstrom pore size), from Rohm & Haas, Philadelphia, Pa.

The surface area of this material is approximately 800 meters$^2$/gm. This high surface area, which is retained even in the absence of swelling fluids, makes macroreticulate poly(styrene-divinylbenzene) a particularly useful support for gas purification in accordance with the present invention, relative to polymer supports having a non-macroreticulate character.

The characteristics of preferred supports which are particularly useful in scavengers of the invention include (a) high surface area to disperse the active scavenging sites, for example a surface area in the range of from about 100 to about 1000 square meters per gram of support, (b) high porosity, such as a significant porosity from pores with a diameter in the range of from about 3 to about 200 Angstroms, and (c) good thermal and mechanical stability, e.g., thermally and mechanically stable at temperatures up to about 250 degrees Centigrade.

In the practice of the invention wherein polymeric macroreticulate scavenger supports of the previously described type are employed, it will generally be suitable to employ a concentration of from about 0.5 to about 50 milligrams of the aforementioned active scavenging compound per gram of polymer, and preferably from about 5 to about 25 milligrams of active scavenging compounds per gram of polymer.

For scavenger supports in general, it is advantageous to utilize a support providing a surface area greater than about 50 meters$^2$/gm and preferably a surface greater than about 150 meters$^2$/gm, as determined by standard nitrogen BET measurement.

The supports in accordance with the invention may suitably be provided in particular form, e.g., in the form of beads, pellets, granules, or other forms from which beds of the scavenger may be formed, as a configuration for contacting the scavenger with impurity-containing gaseous hydrogen selenide and/or hydrogen telluride. In polymer support scavenger beds, beads of the polymer suitably may for example have a diameter on the order of from about 0.3 to about 1.0 mm.

When the aforementioned macroreticulate polymer supported scavenger is provided as a bed of material, through which the water impurity-containing gaseous hydrogen selenide and/or hydrogen telluride is flowed, processing rates on the order of from about 500 to about 2,000 volumes mixture/volume bed/hour are generally practical, for polymer provided in bead form having the aforementioned preferred dimensional characteristics, i.e., a diameter of from about 0.3 to about 1.0 mm.

The scavengers according to the invention are capable of removing the water vapor content of moisture-containing gaseous hydrogen selenide and/or hydrogen telluride, down to exceedingly low levels, e.g., on the order of about 0.1 ppm by volume and lower. The overall heat of reaction for each of the water scavenging reactions (III) and (IV) is 28.0 kcal/mole, yielding for example an equilibrium water vapor concentration of 0.00035 ppm by volume for hydrogen selenide at 1 atmosphere pressure.

The scavengers of the invention may as indicated, be readily formed into a bed through which the impuritycontaining gas mixture is flowed for purification thereof, thereby providing a highly efficient removal system for substantially eliminating water and other impurities from hydrogen selenide and/or hydrogen telluride. By way of example, suitable scavengers according to the invention may varioiusly provide water removal capacity of from about 0.5 to about 20.0 liters of gaseous water per liter of bed of the scavenger. In some instances where the impurity-removing reactions are highly exothermic in character, it may be desirable to utilize a lower removal capacity, based on water, e.g., of from about 1 to about 10 liters gaseous water per lier of bed of the scavenger.

The impurity removal capacity of the bed may of course by readily adjusted to a particular desired level by controlling the loading of the active scavenging compounds and/or precursor compounds on the support, in the impregnation or other fabrication step by which such compounds are applied to the supports.

The single drawing hereof shows a schematic representation of an apparatus for carrying out the purification method of the invention.

The vessel 10 comprises an upper cylindrically shaped block 12 joined to the cup-like receptable 14 by means of circumferentially extending weld 16. In the lower portion of receptacle 14 is disposed a bed 18 of the scavenger according to the present invention.

The vessel features means for introducing impuritycontaining gas mixture, comprising as a primary component one of hydrogen selenide and hydrogen telluride, into the interior space of the receptacle 14 for contact with the scavenger in bed 18. Such introduction means comprise the conduit 20, provided at its exterior end with an appropriate fitting 22 for joining with the supply line 32 to gas mixture source 30. The conduit 20 passes through the block 12 as shown, in a generally horizontal direction toward the center of the block and then downwardly extends from the block into the bed 18. At its lower portion in contact with the bed, this conduit has a plurality of gas distribution openings 34, through which the gas mixture flows outwardly and upwardly through the scavenger in the bed.

Above the bed in the receptable 14, the impurity-depleted gas flows into the outlet conduit 24, provided with a suitable fitting 26 for connection to the product gas discharge line 28, from which the purified gas may be supplied to a downstream end-use processing facility.

In general, a high dispersion of active scavenging sites is provided, the specific loading of active scavenger being controlled by the amount of precursor $R_{3-x}AlH_x$ added to the support.

The scavengers of the present invention provide low levels of water and oxygen in the purified gas streams, since there are large thermodynamic driving forces in the appropriate reactions between water or other proton-source contaminatns, or oxidants, and the active scavenging compound. The products of such reactions and the specific choice of support materials and active scavenging precursor compounds are desirably made to minimize, preferably eliminate, any contamination of the product gas stream.

The advantages and features of the inventon are further shown with respect to the following non-limiting examples.

EXAMPLE I

A suitable quantity of Amberlite XAD4 is introduced to a flask and sized by washing with tap water to remove fines. The sized polymer then is washed in sequence with deionized water, methanol, isopropanol, and hexane, each in an amount equal to twice the volume of the bed of polymer. All organic solvents such as reagent grade.

The polymer is air-dried overnight. The dried polymer is placed in a 500 Whitney sample cylinder (304 stainless steel), equipped with a heat exchanger on the inlet. The bed polymer is heated to 150° C. under a stream of nitrogen overnight, and allowed to cool under a stream of nitrogen. After the bed is cooled to room temperature, 500 milliliters of 1 M diisobutylaluminum hydride in hexane is passed through the bed. About 50 mol of sparged hexane is flushed through the inlet lines.

The solvent is removed from the polymer bed at 120° C. under a stream of nitrogen. After heating the bed overnight, the bed is allowed to cool under a stream of nitrogen.

EXAMPLE II

An organoaluminum functionalized bed prepared according to the procedure described in Example I is used to make an aluminum selenide scavenger. The nitrogen gas stream is reduced to 100 milliliters per minute. Hydrogen selenide is introduced into the nitrogen gas stream at 20 milliliters per minute. The exit gas is scrubbed through a sodium hypochlorite trap to remove hydrogen selenide. This process is continued, to pass 1.5 moles of hydrogen selenide into the bed.

The nitrogen flow is then cut off and pure hydrogen selenide at 20 milliliters per minute is passed through the bed for 30 minutes. The hydrogen selenide gas stream is then shut off and the excess hydrogen selenide is flushed out using a nitrogen stream.

EXAMPLE III

A hydrogen telluride scavenger is prepared by the procedure of Examples I and II, but with the diisobutylaluminum hydride functionalized polymer bed being functionalized using hydrogen telluride instead of hydrogen selenide as in Example II.

EXAMPLE IV

The hydrogen selenide scavenger of Example II is tested by passing hydrogen selenide gas through it and measuring the water level in it by gas chromatography. The inlet water concentration is 50 ppm while the residual water in the purified hydrogen selenide is less than the detection limit (2 ppm).

EXAMPLE V

The hydrogen telluride scavenger of Example II is tested by passing hydrogen telluride gas through it and measuring the water level of the effluent by gas chromatography. The inlet water concentration is 50 ppm while purified hydrogen telluride contains less than the detection limit (2 ppm).

EXAMPLE VI

The water capacities of the hydrogen selenide and hydrogen telluride scavengers are determined by passing wet nitrogen through the respective purifies and measuring aliquots of the exit gas by gas chromatography to determine when water breakthrough occurs. The water capacities of the hydrogen selenide and hydrogen telluride purifiers are 4, and 3, liters of water per liter of bed, respectively.

While preferred embodiments to the invention have been described in detail, it will be appreciated that other variations, modifications, and embodiments are possible, and accordingly, all such variations, modifications, and embodiments are to be regarded as being within the spirit and scope of the present invention.

What is claimed is:

1. A process for purifying a gaseous mixture comprising:
   (i) a primary component selected from one or more members of the group consisting of hydrogen selenide and hydrogen telluride, and
   (ii) impurities selected from one or more members of the group consisting of moisture and oxidants, to remove said impurities therefrom, said process comprising:
   contacting the mixture with a scavenger including a support having associated therewith an active scavenging component selected from one or more members of the group consisting of:
   (a) $R_{3-x}AlH_x$, wherein x is 0 or 1, and R is an alkyl hydrocarbon radical containing from 1 to 12 carbon atoms; and
   (b) an aluminum chalconide of the corresponding primary component of the gaseous mixture.

2. A process according to claim 1, wherein the primary component of the gaseous mixture is hydrogen selenide, and the active scavenging compound is aluminum selenide.

3. A process according to claim 1, wherein the primary component of the gaseous mixture is hydrogen telluride, and the active scavenging component aluminum telluride.

4. A process according to claim 1, wherein said impurities comprise water.

5. A process according to claim 1, wherein said support is selected from the group consisting of: aluminosilicates; alumina; silica; carbon; and macroreticulate polymers.

6. A process according to claim 1, wherein said support is alumina.

7. A process according to claim 1, wherein said support is a macroreticulate polymer.

8. A process according to claim 1, wherein the active scavenging component precursor associated with the support is $R_{3-x}AlH_x$, and wherein said precursor is converted to its corresponding aluminum chalconide by reaction with the primary component of the gaseous mixture to be purified.

9. A process according to claim 1, wherein said support has a surface area in the range from about 50 to about 1,000 square meters per gram of support.

* * * * *

UNITED STATES PATENT AND TRADEMARK OFFICE
CERTIFICATE OF CORRECTION

PATENT NO. : 4,865,822

DATED : September 12, 1989

INVENTOR(S) : Glenn M. Tom, Duncan W. Brown

It is certified that error appears in the above-identified patent and that said Letters Patent is hereby corrected as shown below:

In the Abstract, third line from the bottom, change "hyhrogen" to --hydrogen--.

Column 1, line 52, change "aluminium" to --aluminum--.

Column 3, line 19, change "ore" to --or--.

Column 3, line 37, change "abovedescribed" to --above-described--.

Column 4, line 4, change "impurityscavening" to --impurity-scavenging--.

Column 4, line 51, change "scavening" to --scavenging--.

Column 5, line 14, change "physcially" to --physically--.

Column 5, line 29, change "scavening" to --scavenging--.

Column 5, line 44, change "activc" to --active--.

Column 7, lines 61-62, change "impuritycontaining" to --impurity-containing--.

Column 6, line 23, change "prodcuts" to --products--.

Column 7, line 67, change "varioiusly" to --variously--.

Column 8, lines 21-22, change "impuritycontaining" to --impurity-containing--.

Column 8, line 49, change "contaminatns" to --contaminants--.

UNITED STATES PATENT AND TRADEMARK OFFICE
CERTIFICATE OF CORRECTION

PATENT NO. : 4,865,822

DATED : September 12, 1989

INVENTOR(S) : Glenn M. Tom, Duncan W. Brown

It is certified that error appears in the above-identified patent and that said Letters Patent is hereby corrected as shown below:

Column 8, line 55, change "inventon" to --invention--.

Signed and Sealed this

Second Day of October, 1990

*Attest:*

HARRY F. MANBECK, JR.

*Attesting Officer*     *Commissioner of Patents and Trademarks*